US010853402B2

(12) United States Patent
Wu (10) Patent No.: US 10,853,402 B2
(45) Date of Patent: Dec. 1, 2020

(54) MEDIA FILE PROCESSING METHOD AND DEVICE, AND MEDIA FILE SHARING METHOD AND DEVICE IN SOCIAL MEDIA APPLICATION

(71) Applicant: Tencent Technology (Shenzhen) Company Limited, Shenzhen (CN)

(72) Inventor: Fengkai Wu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 200 days.

(21) Appl. No.: 15/940,515

(22) Filed: Mar. 29, 2018

(65) Prior Publication Data

US 2018/0217995 A1    Aug. 2, 2018

Related U.S. Application Data

(63) Continuation of application No. PCT/CN2016/108648, filed on Dec. 6, 2016.

(30) Foreign Application Priority Data

Dec. 8, 2015  (CN) .......................... 2015 1 0903866

(51) Int. Cl.
*G06F 16/44*       (2019.01)
*G06F 16/48*       (2019.01)
(Continued)

(52) U.S. Cl.
CPC ............ *G06F 16/447* (2019.01); *G06F 16/48* (2019.01); *G06T 13/00* (2013.01); *H04L 51/32* (2013.01); *G06Q 50/01* (2013.01)

(58) Field of Classification Search
CPC ....... G06F 16/447; G06F 16/48; G06T 13/00; G06Q 50/01
See application file for complete search history.

(56) References Cited

U.S. PATENT DOCUMENTS

| 7,694,225 B1 | 4/2010 | Weber et al. | |
| 2008/0205789 A1* | 8/2008 | Ten Kate | G06F 16/58 |
| | | | 382/284 |

(Continued)

FOREIGN PATENT DOCUMENTS

| CN | 101026726 A | 8/2007 |
| CN | 101690154 A | 3/2010 |

(Continued)

OTHER PUBLICATIONS

International Search Report and Written Opinion dated Feb. 27, 2017 for PCT/CN2016/108648 (12 pp.).

*Primary Examiner* — Roland J Casillas
(74) *Attorney, Agent, or Firm* — Brinks Gilson & Lione (57) ABSTRACT

A media file processing method is described. Multiple selected media files are processed by a terminal device comprising a processor and a memory storing computer readable instructions executed by the processor. The terminal device extracts content association information corresponding to the multiple selected media files. The terminal device further synthesizes the multiple selected media files according to the content association information to obtain an animation that is a dynamic presentation of contents of the multiple selected media files. The animation is then stored in a predetermined file format in the terminal device.

12 Claims, 5 Drawing Sheets

(51) Int. Cl.
*G06T 13/00* (2011.01)
*H04L 12/58* (2006.01)
*G06Q 50/00* (2012.01)

(56) References Cited

U.S. PATENT DOCUMENTS

| | | | | |
|---|---|---|---|---|
| 2013/0125000 | A1* | 5/2013 | Fleischhauer | G11B 27/031 715/723 |
| 2014/0219629 | A1* | 8/2014 | McIntosh | G11B 27/105 386/241 |
| 2014/0317212 | A1* | 10/2014 | Barman | G06Q 10/10 709/206 |

FOREIGN PATENT DOCUMENTS

| | | |
|---|---|---|
| CN | 103744996 A | 4/2014 |
| CN | 103945134 A | 7/2014 |
| CN | 104184811 A | 12/2014 |
| CN | 105005597 A | 10/2015 |
| CN | 105528427 A | 4/2016 |

\* cited by examiner

MEDIA FILE PROCESSING METHOD AND DEVICE, AND MEDIA FILE SHARING METHOD AND DEVICE IN SOCIAL MEDIA APPLICATION

RELATED APPLICATION

This application claims priority to International Patent Application No. PCT/CN2016/108648 filed on Dec. 6, 2016, which claims priority to Chinese Patent Application No. 201510903866.8, filed with the Chinese Patent Office on Dec. 8, 2015 and entitled "MEDIA FILE PROCESSING METHOD, AND SHARING METHOD AND DEVICE IN SOCIAL APPLICATION", both of which are incorporated herein by reference in their entireties.

FIELD OF THE TECHNOLOGY

This application relates to the field of computer application technologies, and in particular, to a media file processing method and device and a media file sharing method and device in a social media application.

BACKGROUND OF THE DISCLOSURE

With the wide spread of various portable mobile devices in people's daily life and work, the use of a portable mobile device to take a photograph or video is becoming more common. People have become accustomed to use portable mobile devices to take photographs or videos in their work and daily life.

Accordingly, there are increasing amount of media files, that is, photograph and video files, stored in a portable mobile device. In terms of subsequent content browsing and corresponding content sharing, a quick preview of such a large number of media files cannot be easily achieved.

For example, when people take photographs or videos, the photograph or video files obtained usually include specific characters, objects, or locations. For example, some photographs are taken at a specific location and some photographs are taken at a specific scene. One has to view these media files one by one in order to know their contents, and cannot easily conduct a quick preview of the contents.

SUMMARY

This disclosure provides a media file processing method and a terminal device for implementing the media file processing method. The method and terminal device are capable of achieving a quick preview of contents of multiple media files. For example, the terminal device may retrieve and analyze multiple media files selected by a user by extracting content association information among the multiple media files. The terminal device then synthesizes an animation based on the extracted content association information. The synthesized animation represents a dynamic presentation of contents of the multiple media files.

This disclosure further provides a media file sharing method and a terminal device for implementing the media file sharing method in a social media application. For example, the terminal device may monitor local media files accessed by a user in a social media setting and automatically extract content association information among the accessed local media files, and create an animation of the accessed local medial files for sharing in the social network setting.

The disclosure thus provides a convenient way for browsing and sharing multiple media files in an animated manner. A user only needs to make a selection of a group of media files or access local media files. Content association information and an animation of the group of media files are automatically extracted and created. As such, browsing and sharing of multiple media files may be achieved efficiently and automatically in aggregation without having to transmitting each individual media file, reducing the amount of network traffic.

DESCRIPTION OF EMBODIMENTS

Typical implementations showing features and advantages of this application are described in detail in the following description. It should be understood that this application may have some variations in different implementations without departing from the scope of this application, and descriptions and figures are essentially used as examples, and are not intended to limit the protective scope this application.

As described in the foregoing, in a terminal device, for media files stored locally, contents of the media files are usually browsed by switching (or flipping) between the media files. The browsing efficiency is thus low and multiple user operation steps are required for browsing media files.

According to another aspect, in the terminal device, most applications configured for processing of media files are designed and optimized for processing a single media file. Such applications may include but are not limited to photograph beautification and touchup applications for processing individual photographs one at a time. A quick preview of a collection of media files in the terminal device cannot be easily and quickly performed.

Therefore, to easily and quickly perform a quick preview of media files in a terminal device, embodiments of this application provide a media file processing method. The media file processing method may be implemented in any type of computer device with a display screen. Correspondingly, a media file processing device having a display screen, such as a terminal device, may be based on running by the terminal device the media file processing application.

Figure 1:
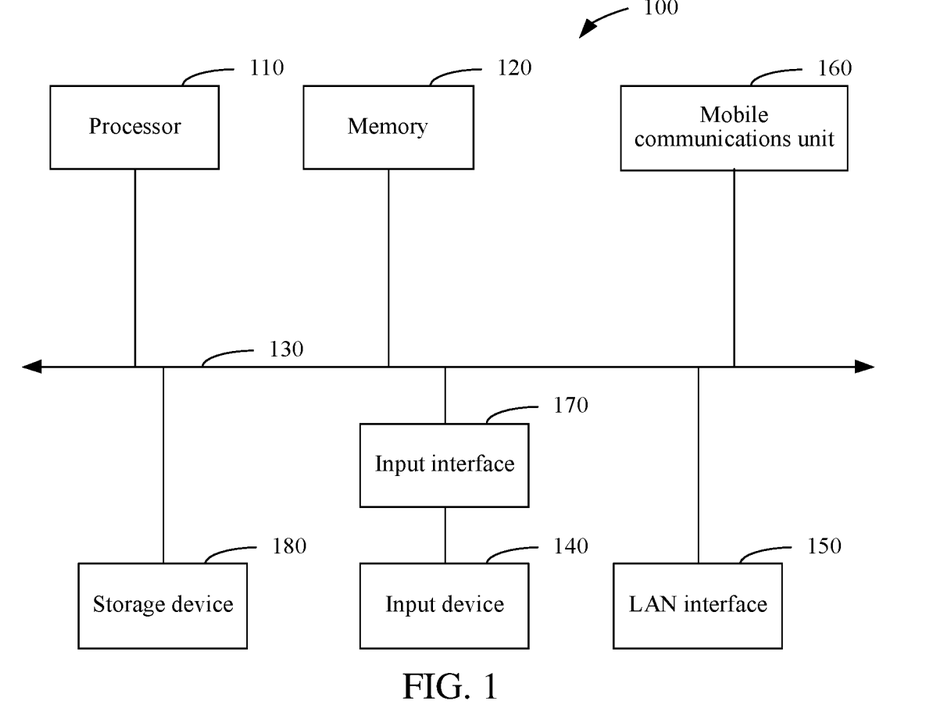
FIG. 1 is a schematic structural diagram of a terminal device according to an embodiment of this application.

FIG. 1 shows a schematic structural diagram of a terminal device according to an embodiment of this application. The terminal device 100 is merely an example, and should not be construed as a limitation on the protective scope of this application. The terminal device 100 also cannot be interpreted as needing to rely on or having to include a combination of one or more combinations of components as exemplarily illustrated by FIG. 1.

As shown in FIG. 1, the terminal device 100 includes a processor 110, a memory 120, and a system bus 130. Various components including the memory 120 and the processor 110 are connected to the system bus 130. The processor 110 is configured to execute computer program instructions by means of basic arithmetic and logical operations in a computer system. The memory 120 is a physical device configured to temporarily or permanently store computer program instructions or data. The computer program instructions may be alternatively referred to as computer programs, or computer instructions, or simply, instructions.

The memory 120 stores the computer program instructions and stores media files as part of the data. The processor 110 executes the computer program instruction in the memory 120 to monitor and responds to selection of the media files by users.

The terminal device 100 further includes an input interface 170 and peripheral input devices 140, so as to implement input of various user operations and other input signals. The input devices 140 may include at least one of a touch screen, a push-button, a keyboard or a mouse.

The terminal device 100 may further include a storage device 180. The storage device 180 may include one or more computer readable storage media of various types. The computer readable storage medium may be any available medium which can be electronically accessed, including any removable medium and fixed medium. For example, the computer readable storage medium may include but is not limited to a flash memory (micro SD card), a CD-ROM, a digital versatile disc (DVD) or other discs, a tape cassette, a tape storage device or other storage devices, or any other electronically accessible medium which can be configured to store necessary information.

As described in detail above, the terminal device 100 applicable to this application executes a designated operation during media file processing, that is, the program instructions in the memory 120 are executed by the processor 110 to perform the designated operations, so as to implement processing of media files in the terminal device 100.

In addition, the various implementation of this application may be achieved by means of either a hardware circuit or a hardware circuit combined with software instructions. Therefore, implementation of this application is not limited to any specific hardware circuit, software or a specific combination of two.

Figure 2:
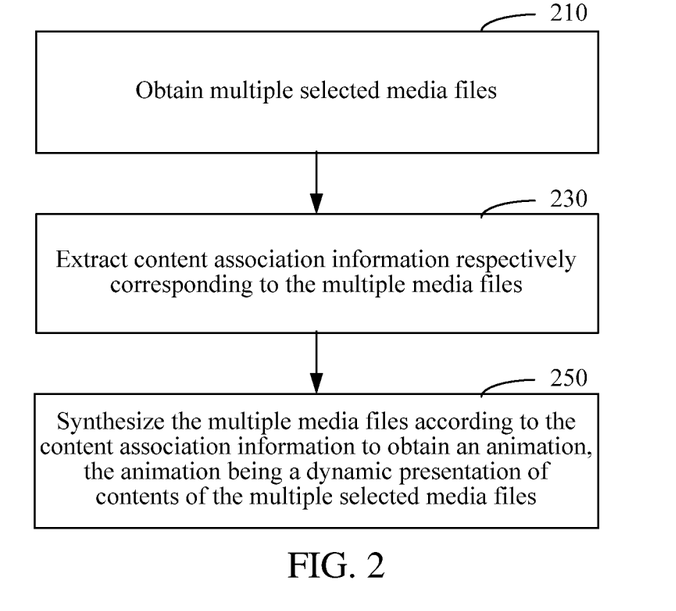
FIG. 2 is a logic flow of a media file processing method according to an embodiment of this application.

In an embodiment of this application, the media file processing method is as shown in FIG. 2, including:

Step S210: Obtain by the terminal multiple selected media files.

The multiple selected media files may include at least an image and/or video file. That is, the multiple selected media files may be multiple image files, multiple video files, or a combination of the multiple image and video files.

The selected media files may be media files stored locally in a terminal device, for example, media files selected by means of a media album application in the terminal device; or may be media files stored in other storage devices and read or downloaded by the terminal device.

In one implementation, all the media files stored locally may be obtained by accessing the media album application in the terminal device. The multiple selected media files are obtained after a selection operation triggered for the media files by a user in a display interface of the media album application.

Step S230: Extract by the terminal device content association information corresponding to each of the multiple media files.

Each media file may include corresponding attribute information, and the content association information may be extracted from the attribute information. The content association information may include information that may be used for associating a media file with other media files in content, and may thus be used to mark association between the media files.

For example, the content association information may include creation time points of the media files. A series of media files with similar creation time points may be associated media files. In this embodiment of this application, being similar in the creation time points for two media files, e.g., may mean that a creation time interval between the two media files is less than a preset time threshold.

The media files associated with each other can be identified among the multiple selected media files by means of extracting and comparing content association information included in the multiple selected media files such as creation time points.

Step S250: Synthesize by the terminal the multiple media files according to the content association information to obtain an animation, the animation being a dynamic presentation of contents of the multiple selected media files.

The multiple selected media files are synthesized to output the animation. A quick preview of the contents of the multiple media files are achieved by means of the animation. In the synthesized animation, a display duration of the contents of the media files in the animation and a display order of the contents of the media files in the animation are calculated and determined according to the extracted content association information.

The animation obtained by synthesizing the multiple selected media files may be in a format of a video file or a format of an animated image file, for example, an animated gif image, and may be determined according to storage and transmission requirements.

By means of the method described above, multiple selected media files are synthesized according to content association information extracted from the multiple selected media files to obtain an animation. By means of the animation, a quick browse of contents of the multiple media files is achieved. As such the sharing of the contents among users and terminal devices are facilitated and are more accurately targeted. In addition, a display duration and a display order of the contents of the media files in the animation are configurable and may be determined by the content association information.

For example, for multiple selected photographs, frame rates corresponding to the photographs in an animation formed by the photographs dynamically change according to content association information of the photographs, rather than staying invariant. In addition, for content display of the media files in the animation, the display order and display duration of the contents of the media files in the animation are determined according to the contents of the media files, thereby ensuring a targetability and flexibility during synthesis of the media files.

By means of the method described above, implementations of this application provide a method for quickly generating an animation of multiple media files. Therefore, multiple media files may be arbitrarily selected in a mobile device. Synthesis of the animation may be performed according to content association information extracted from the selected to the media files, so as to output a corresponding animation such as a video file or an animated image file.

A user simply needs to perform a media file selection operation via a mobile device (a terminal), and then the mobile device can quickly synthesize photographs or a combination of photographs and video files taken by the mobile device and selected by the user to obtain an animation with configurable playback frame rates. This method is easy and quick to implement, greatly saving time needed for synthesis and avoid need for switching to and using a professional device or application, and can conveniently allow the user to perform a quick preview.

Figure 3:
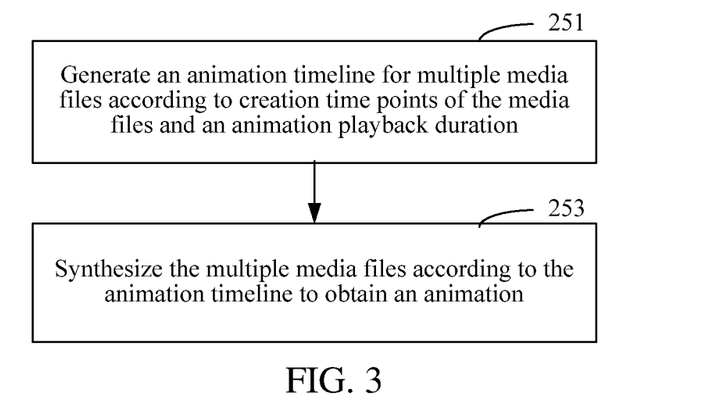
FIG. 3 is a logic flow of a method for synthesizing multiple media files according to content association information to obtain an animation according to an embodiment of this application.

In one implementation, the content association information includes information of creation time points of the media files. According to step S250, this implementation of this application provides a method for synthesizing multiple media files according to content association information to obtain an animation. As shown in FIG. 3, for this implementation, the step 250 includes the following steps.

Step S251: Generate by the terminal an animation timeline for the multiple selected media files according to the creation time points of the selected media files and an animation playback duration.

As described in the following, the content association information is extracted from attribute information of the media files, and the creation time points may also be further extracted from the attribute information of the media files. For a photograph or video, the creation time point may be a time point when the photograph or the video is taken (shooting time). A series of time-consecutive media files may be obtained by ordering the multiple selected media files according to the creation time points. In addition, display time points of the contents of the media files in the animation may be set according to the creation time points.

The animation playback duration may be preset. The display time point of a content of each media file in the multiple selected media files in the animation may be calculated according to the creation time point and the preset animation playback duration. The animation timeline is formed by assembling consecutive display time points of the contents of the multiple media files in the animation. The frame rate of playback of a content of each media file in the animation is controlled by means of the animation timeline.

In this implementation, step S250 further include step S253: Synthesize the multiple media files by the terminal according to the animation timeline to obtain the animation.

The media files are synthesized according to playback time points of the content of each media file marked by the animation timeline, so as to generate the animation. In the animation, the contents of the multiple selected media files dynamically change from one media file to another.

In another implementation, the content association information may include various features and the animation may be created according to similarity of the multiple selected media file as to one of the features Therefore, before step S230, the method described above further includes:

aggregating the multiple media files according to similarity of a selected feature between the multiple selected media files to form at least one file sequence.

The similarity between the media files as to a selected feature may be aggregated, so as to obtain media files associated with each other in the multiple selected media files by the selected feature, and the media files associated with each other by the selected feature can be aggregated to form a file sequence.

The features may be a shooting location, a facial feature in the media files and so on. A similarity degree between the contents of the media files as to a selected feature can be identified by comparing the selected feature of the multiple selected media files, and the media files having similar selected feature may be aggregated according to the similarity feature, and similar media files can be aggregated together to form at least one file sequence. For example, the selected feature may be location where a media file is created. The multiple selected media files may include media files take at various locations and there may be multiple media files taken at each location. Locations that are within the same city, for example, may be predetermined as being similar. The multiple selected media files may thus be aggregated into file sequences, each sequence containing media files taking in a different city.

Accordingly, it can be seen that the file sequence includes several media files associated with each other. The media files form the file sequence (having similar selected feature) may further be ordered according to a specific order (e.g., shooting time). An association relationship between the media files in the file sequence may be established based on one or more features being similar (rather than just one feature being similar). A sequence aggregated based on one similar feature may be sub aggregated within the sequence based on similarity of another feature or another group of features. In other words, the aggregation of the multiple selected media files may be nested according to similarities of features.

In one implementation, the order of the at least one file sequence in the animation may be determined by average shooting time points of the at least one file sequence. For example, a file sequence of media files having an earlier average shooting time points may be placed ahead of another file sequence of media file having a later average shooting time points in the animation.

Figure 4:
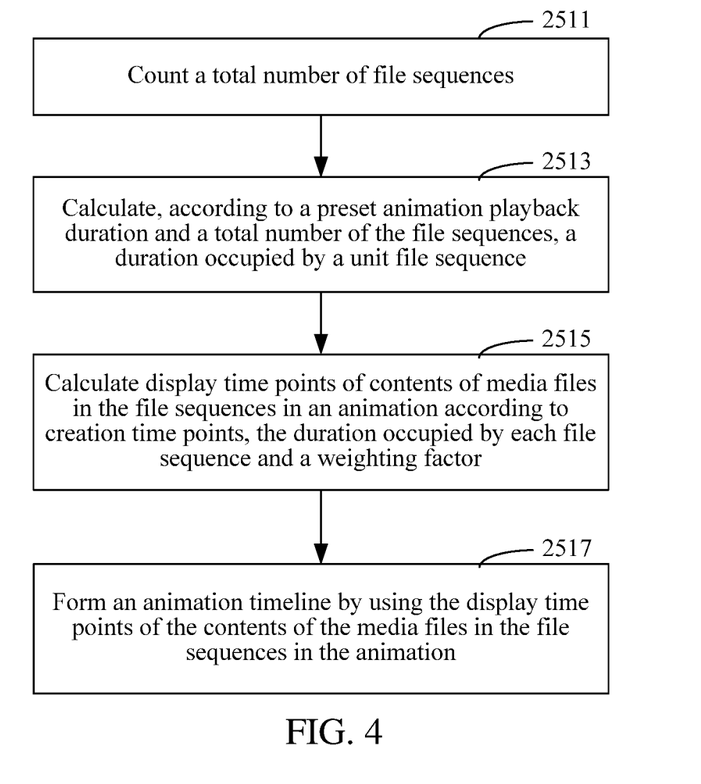
FIG. 4 is a logic flow of a method for generating an animation timeline for multiple media files according to creation time points and an animation playback duration according to an embodiment of this application.

According to step S251, an implementation of this application provides a method for generating an animation timeline for multiple media files according to creation time points and an animation playback duration. As shown in FIG. 4, on implementation of the step S251 of the method may include:

Step S2511: Count, by the terminal, a total number of the file sequences.

The file sequences formed by aggregating the multiple selected media files is counted to obtain the total number of the file sequences corresponding to the multiple selected media files. Each sequence include media files having a similar feature.

Step S2513: Calculate, by the terminal, according to the preset animation playback duration and the total number of the file sequences, a duration occupied by a unit file sequence (occupied by each file sequence).

For example, the preset animation playback duration is divided by the total number of the file sequences to calculate the duration occupied by each file sequence. A calculated time period in the animation is allocated for each file sequence by using this procedure.

Step S2515: Calculate, by the terminal, display time points of the contents of the media files in the file sequences in the animation according to the creation time points, the duration occupied by each file sequence (e.g., the calculated time period), and a weighting factor.

In this embodiment of this application, the calculated time period for a file sequence in the animation may be allocated for each media file in the sequence in average; or the weighting factor may be set, so that the time period is adjusted according to requirements. For example, the weighting factor may be set according to an expect playback speed set by a user, and the weighting factor may be in an exponential format.

In an embodiment, the display time points of the contents of the media files in the file sequences in the animation may be calculated according to the following manner:

as described in the foregoing, the duration occupied by each file sequence equals the animation playback duration divided by the total number of the file sequences;

an average display duration of the content of each media file in a file sequence in the animation equals the duration occupied by the file sequence divided by a number of the media files included in the file sequence;

based on this, a display time point of a content of the nth media file in a file sequence equals a sum of an interval between a creation time point of the nth media file and a creation time point of the (n−1)th media file and an interval between the creation time point of the nth media file and a creation time point of the (n+1)th media file, multiplied by the weighting factor, and further multiplied by the average display duration.

Step S2517: Form the animation timeline, by the terminal, by using the display time points of the contents of the media files in the file sequences in the animation.

The display time point of the content of each media file in each file sequence in the animation is combined together to form the animation timeline. Subsequently, the corresponding animation can be obtained by playing corresponding media files and performing playback controlling according to the timeline.

In one implementation, the feature used for aggregating the multiple selected media files may be shooting locations of the media file. The above described step of aggregating the multiple media files to form at least one file sequence includes:

aggregating multiple media files corresponding to a same shooting location (same city, for example) to form at least one file sequence and sorting the media files in the each file sequence according to the creation time points.

For photographs or videos taken by mobile devices, most mobile devices are provided with a locating function; therefore, the multiple media files corresponding to the same shooting location in the multiple selected media files may be aggregated to form the file sequence. If the multiple selected media files are corresponding to multiple shooting locations, multiple file sequences are formed correspondingly.

Similarly to the shooting location, the feature for media file aggregation may be a facial feature obtained by performing facial recognition on the contents of the media files, and then at least one file sequence is obtained by performing aggregating according to the facial feature in the media files.

For the multiple media files aggregated together, the media files are sorted in the file sequence according to the creation time points, so as to obtain a file sequence formed according to a chronological order in creation time point.

Figure 5:
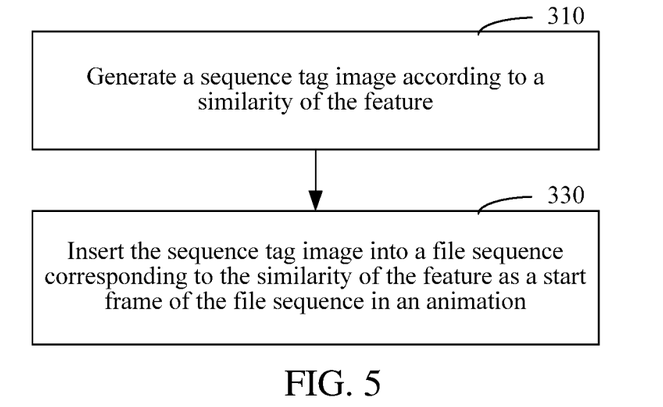
FIG. 5 is a logic flow of another media file processing method according to an embodiment of this application.

In another implementation, after the step of aggregating the multiple media files according to the similar feature to form at least one file sequence, the above described media file processing method further includes the following steps shown in FIG. 5.

Step S310: Generate a sequence tag image according to the similar feature.

It can be identified from the aggregating process described above that each file sequence aggregates a group of media files having the similar feature. The sequence tag image may be generated for each file sequence according to the similar feature of this group of media files, and the sequence tag image is used to mark this group of media files included in the file sequence. For example, if the feature used for aggregation is a shooting location, the similar shooting location of this group of media files in the file sequence may be represented by the generated sequence tag image. For example, the generated sequence tag image for a group of media files taken at a particular location may be image containing the most famous or a characteristic landscape of this location.

Step S330: Insert the sequence tag image into the file sequence having the similar feature as a start frame of the file sequence in the animation.

The generated sequence tag image is used as the start frame of the file sequence in the animation, that is, the first image in the file sequence, so that the tag image identifying the group that the media files in the file sequence pertains to is displayed at first when the output animation plays the file sequence.

By means of the generation and insertion of the sequence tag image, switching between the file sequences and association contents of the media files in the file sequences are marked in the animation. For example, a file sequence of media files corresponding to location A is marked in the animation containing sequences of media files taken at various locations. Similarly, media files corresponding to character B is marked in the animation containing sequences of media files containing various characters. As such, a quick and convenient preview of the media files may be achieved.

By means of the media file processing method described above, an animation for quickly and dynamically presenting contents of media files is generated. The animation may be of various formats, such as an animated gif image, a video file of an mp4 format or a video file of a mov format.

By means of the media file processing method described above, multiple media files are aggregated to form an animation. Because for a mobile device, multiple media files rather than an aggregated animation may occupy larger storage space, such aggregation may help reduce storage requirement for storing the media. In addition, contents of the corresponding media files can be browsed at any time by playing the stored the animation.

By means of the media file processing method described above, static images can be aggregated to an animation format. A quick preview of static images is achieved, and at the same time, presentation manners of the static images are enriched.

Figure 6:
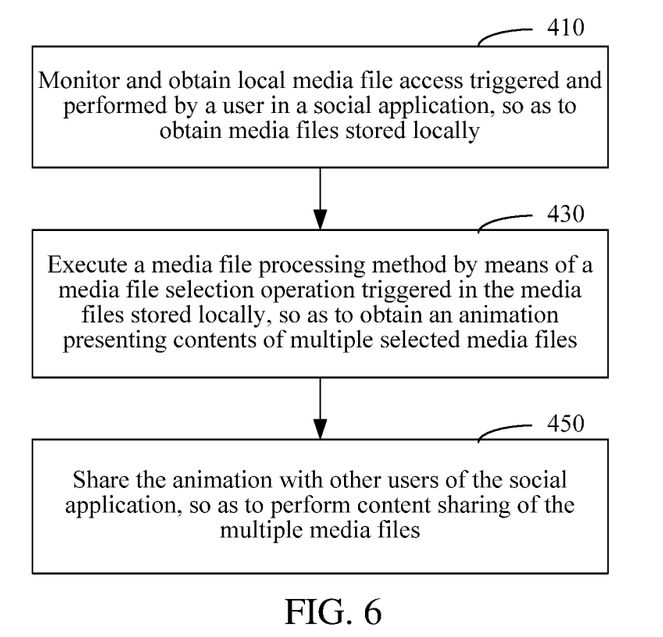
FIG. 6 is a logic flow of a media file processing method in a social media application according to an embodiment of this application.

The embodiments of this application further provide a media file sharing method in a social media application. As shown in FIG. 6, the method includes the following steps.

Step S410: Monitor by the terminal and obtain local media file access triggered and performed by a user in the social media application, so as to obtain media files stored locally.

A social media application that allow users to share contents of the media files may be an instant messaging application, a virtual social network application, or even various payment application with a messaging function.

In any social media application operated by a terminal device, a user can trigger to access local media files in the social media application at any time if the user needs to share some media files, for example, share a large quantity of photographs taken during a journey.

Accessing the local media files may be achieved by accessing a media album application in the mobile device.

Step S430: Execute, by the terminal, the media file processing method above by means of a media file selection operation triggered in the media files stored locally, so as to obtain an animation presenting the contents of the multiple selected media files.

By accessing the local media files, media files stored locally are displayed on an interface of the social media application, so that the user can select media files that the user wants to share.

After monitoring and obtaining the media file selection operation triggered by the user, the media file processing method described above is executed to output an animation corresponding to the selected media files.

Step S450: Share the animation with other users of the social media application, so as to perform content sharing of the multiple media files.

In this embodiment, the obtained animation is uploaded to a sharing server or transmitted to terminal devices of other users of the social media application, so as to share the animation.

By means of the media file sharing method described above, sharing of the contents of the media files does not require uploading or transmission of the multiple media files, and only needs an uploading or transmission of the animation corresponding to the multiple media files, so that transmission resources and storage resources are greatly reduced and the efficiency of sharing media is greatly improved.

In addition, a recipient of the sharing, correspondingly, only needs to obtain the animation to view the shared contents, and does not needs to obtain the multiple media files, so that system resources and storage space of a recipient device are greatly reduced.

The following describes in detail the above described media file processing method and the media file sharing method in a social media application based on the media file processing method with reference to a specific exemplary implementation scenario.

Specifically, by means of accessing an album application triggered in a social media application, photographs in the album application are read and displayed on an interface of the social media application for a user to select.

While the photographs are displayed on the interface of the social media application, the user may select one or more photographs via a touch panel of a terminal device. The selected photographs may include a group of photographs.

After obtaining the multiple selected photographs, the photographs are aggregated according to shooting locations to form multiple file sequences, and photographs in each file sequence are sorted according to creation time points, that is, shooting time points. That is, in this example, content association information includes the creation time points and a predetermined feature for aggregation, and the aggregation feature is specifically the shooting location.

A number of photographs played in the animation in a unit time period for each file sequence, or referred to as a frame rate, can dynamically change. In this example, for multiple photographs taken in a same shooting location, frame rates corresponding to photographs taken within a smaller shooting interval in the animation are higher (because showing duration of each photo is the same. A frame of location tag image, that is, a sequence tag image described in the foregoing, is played between file sequences corresponding to different shooting locations.

For example, five photographs are taken at 3:00 p.m. in the afternoon at tourist attraction A, ten photographs are taken at 4:00 p.m. in the afternoon at tourist attraction B, and twenty photographs are taken at 5:00 p.m. in the afternoon at tourist attraction C. If the thirty-five photographs are shared directly, the efficiency of sharing is low, more resources are consumed, and costs of sharing are high.

Therefore, by means of the process described above, a ten-second animation may be generated for the thirty-five photographs and then shared, thereby achieving a quick preview and sharing of contents of the photographs.

In this example, the synthesized animation may be synthesized according to two dimensions, that is, a shooting location for aggregation and a shooting time point within each aggregated file sequence. Using photographs of the tourist attraction A as an example, five photographs of the tourist attraction A are aggregated to form a file sequence, that is A[T1, T2, . . . , T5]. The sequence may be ordered by shooting time. And then a display time point of the each photograph in the file sequence is calculated, so as to form an animation timeline. Ten photographs of the tourist attraction B are aggregated to form a file sequence, that is B[T1, T2, . . . , T10]. Similarly, twenty photographs of the tourist attraction C are aggregated to form a file sequence, that is C[T1, T2, . . . , T20].

The location tag images A, B, and C are respectively inserted before T1 in the file sequence A, B, and C. The aggregated, ordered images with inserted tag images are synthesized into the animation and then shared.

Figure 7:
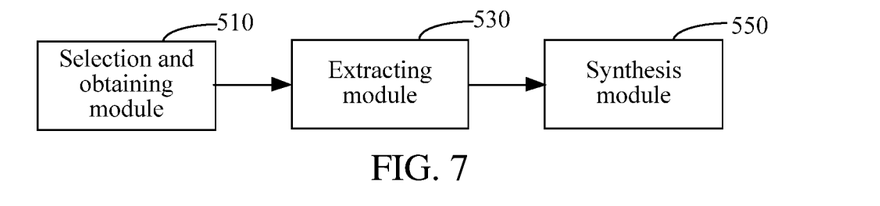
FIG. 7 is a schematic diagram of a media file processing device according to an embodiment of this application.

The embodiments of this application further provide a media file processing device. As shown in FIG. 7, the device includes a selection and obtaining module 510, an extracting module 530, and a synthesis module 550.

The selection and obtaining module 510 is configured to obtain multiple selected media files.

The extracting module 530 is configured to extract content association information corresponding to the multiple selected media files.

The synthesize module 550 is configured to synthesize the multiple selected media files according to the content association information to obtain an animation, the animation being a dynamic presentation of contents of the multiple selected media files.

Further, the content association information includes creation time points of the media files.

Figure 8:
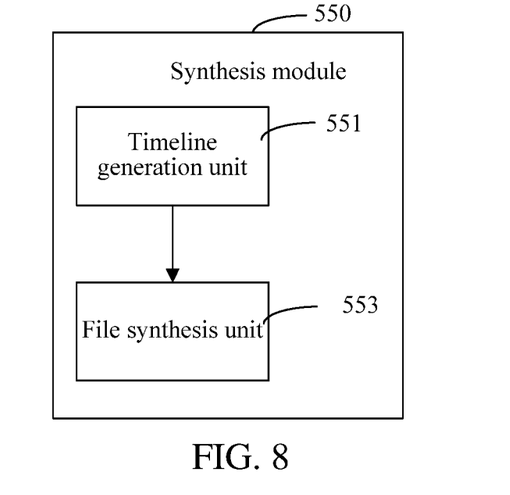
FIG. 8 is a schematic diagram of the synthesis module shown in FIG. 7 according to this embodiment of this application.

As shown in FIG. 8, the synthesize module 550 includes a timeline generation unit 551 and a file synthesis unit 553.

The timeline generation unit 551 is configured to generate an animation timeline for the multiple selected media files according to the creation time points of the media files and an animation playback duration.

The file synthesis unit 553 is configured to synthesize the multiple selected media files according to the animation timeline to obtain the animation.

In one implementation, the content association information includes information about a feature.

Figure 9:
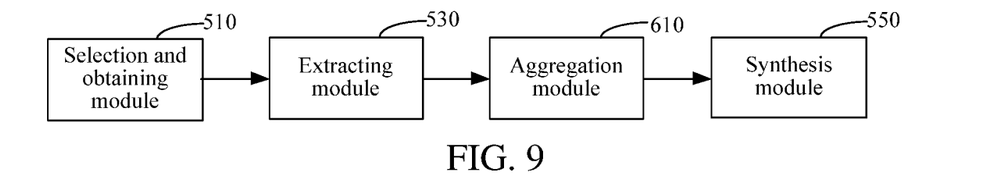
FIG. 9 is a schematic diagram of another media file processing device according to an embodiment of this application.

As shown in FIG. 9, the device further includes an aggregation module 610. The aggregation module 610 is configured to aggregate the multiple selected media files according to the similarity of the feature between the multiple selected media files to form at least one file sequence.

Figure 10:
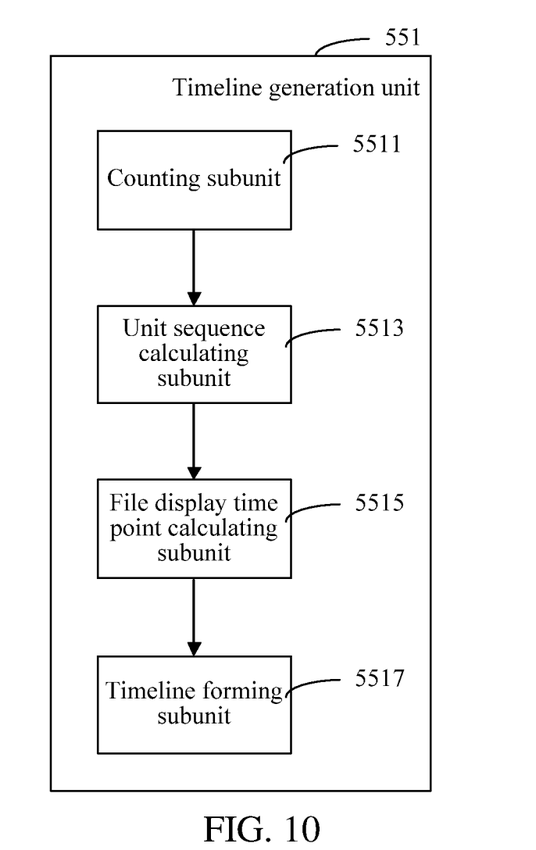
FIG. 10 is a schematic diagram of the timeline generation unit shown in FIG. 8 according this embodiment of this application.

In one implementation, the timeline generation unit 551 includes a counting subunit 5511, a unit sequence calculating subunit 5513, a file display time point calculating subunit 5515 and a timeline forming subunit 5517, which are as shown in FIG. 10.

The counting subunit 5511 is configured to count a total number of the file sequences.

The unit sequence calculating subunit 5513 is configured to calculate according to the preset animation playback duration and the total number of the file sequences, a duration occupied by a unit sequence (each sequence).

The file display time point calculating subunit 5515 is configured to calculate display time points of the contents of the media files in the file sequences in the animation according to the creation time points, the duration occupied by the each sequence, and a weighting factor.

The timeline forming subunit 5517 is configured to form the animation timeline by using the display time points of the contents of the media files in the file sequences in the animation.

In one implementation, the feature for aggregation may be a shooting location of a media file. The aggregation module 610 is correspondingly configured to aggregate multiple media files corresponding to a same shooting location to form at least one file sequence, and sort the media files in the file sequences according to the creation time points.

Figure 11:
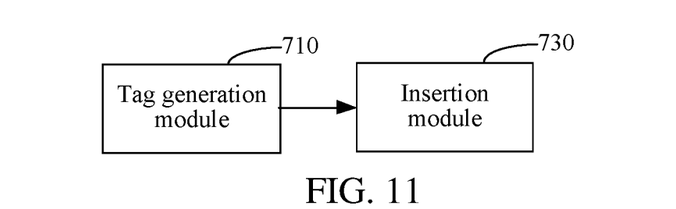
FIG. 11 is a schematic diagram of another media file processing device according to an embodiment of this application.

In one implementation, the file processing device described above further includes a tag generation module 710 and an insertion module 730, which are as shown in FIG. 11.

The tag generation module 710 is configured to generate a sequence tag image according to the similar feature.

The insertion module 730 is configured to insert the sequence tag image into the file sequence corresponding to the similar feature as a start frame of the file sequence in the animation.

Figure 12:
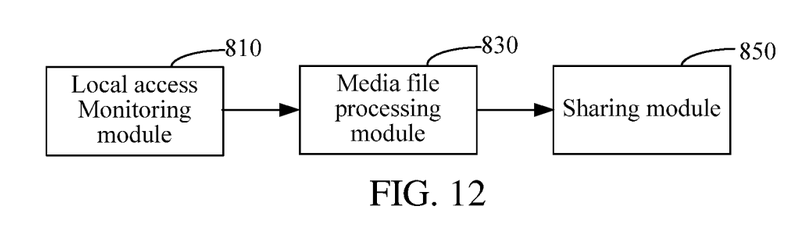
FIG. 12 is a schematic diagram of a media file sharing device for a social media application according to an embodiment of this application.

The embodiments of this application further provide a media file sharing device in a social media application, which is as shown in FIG. 12. The device includes a local access monitoring module 810, a media file processing module 830, and a sharing module 850.

The local access monitoring module 810 is configured to monitor and obtain local media file access triggered and performed by a user in a social media application, so as to obtain media files stored locally.

The media file processing module 830 is configured to trigger to operate the media file processing device described above by means of a media file selecting operation triggered in the media files stored locally, so as to obtain an animation presenting the contents of multiple selected media files.

The sharing module 850 is configured to share the animation with other users of the social media application, so as to perform content sharing of the multiple media files.

The media file processing device provided in the above embodiments may be based on the terminal device shown in FIG. 1.

In some implementations of this application, the processor 110 may be in communication with the memory 120 by means of the system bus 130, so as to perform machine readable instructions stored in the memory 120. The machine readable instructions include an obtaining and selection instruction, an extracting instruction, and a synthesis instruction.

In the embodiments of this application, the processor 110 is configured to read the obtaining and selection instruction, the extracting instruction, and the synthesis instruction stored in the memory 120, so as to achieve functions of the modules in the media file processing device shown in FIG. 7.

Further, the computer readable instructions include an aggregating instruction that can be executed by the processor 110.

The processor 110 is configured to read the obtaining and selection instruction, the extracting instruction, the synthesis instruction, and the aggregating instruction stored in the memory 120, so as to achieve functions of the modules in the media file processing device shown in FIG. 9.

Further, the computer readable instructions include a tag generation instruction and an insertion instruction that can be executed by the processor 110.

The processor 110 is configured to read the tag generation instruction and the insertion instruction stored in the memory 120, so as to achieve functions of the modules in the media file processing device shown in FIG. 11.

The media file sharing device in a social media application provided in the above embodiments may be based on the structure of the terminal device shown in FIG. 1.

In some implementations of this application, the processor 110 may be in communication with the memory 120 by means of the system bus 130, so as to perform machine readable instructions stored in the memory 120. The machine readable instructions include an access monitoring instruction, a media file processing instruction, and a sharing instruction.

In the embodiments of this application, the processor 110 is configured to read the access monitoring instruction, the media file processing instruction, and the sharing instruction stored in memory 120, so as to achieve functions of the modules in the media file sharing device shown in FIG. 12.

A person of ordinary skill in the art may understand that all or some of the steps of the embodiments may be implemented by hardware or a program running by related hardware. The program may be stored in a computer readable storage medium. The storage medium may include: a read-only memory, a magnetic disk, or an optical disc. These storage medium may be non-transitory.

Although this application has been described with reference to several exemplary implementations, it should be understood that the used technical terms are for description and example, and are not intended for limiting the protective scope of this application. This application can be specifically implemented in various forms, without departing from the spirit and essence of this application, therefore, it should be understood that the above embodiments are not limited to any detail described in the foregoing, and should be broadly interpreted within the spirit and range limited by the appended claims. Therefore, all changes and modifications falling within the claims or equivalent scope should be covered by the appended claims.

What is claimed is:

1. A media file processing method, comprising:
obtaining multiple selected media files by a terminal device comprising a processor and a memory storing computer readable instructions executed by the processor;
extracting, by the terminal device, content association information corresponding to the multiple selected media files, wherein the content association information comprises:
shooting location;
creation time point; and
facial property;
aggregating the multiple selected media files according to a similarity of the shooting location or the facial property between the multiple selected media files to form file sequences;
sorting the media files within each of the file sequences according to the creation time point of the media files;
counting a total number of the file sequences;
calculating, according to a preset animation playback duration and the total number of the file sequences, a duration occupied by each of the file sequences;
calculating display time points of the media files in each of the file sequences according to the creation time point of the media files in each of the file sequences and the duration occupied by each of the file sequences;
adjusting the display time points of the media files in each of the file sequences based on a weighting factor;
forming an animation timeline for each of the file sequences, using the calculated display time points of the media files in each of the file sequences;
synthesizing, by the terminal device, for each of the file sequences, the multiple selected media files according to the animation timeline to obtain an animation, the animation being a dynamic presentation of contents of the media files in each of the file sequences;
combining, the animation of each of the file sequences to form a combined animation, based on an order of the file sequences; and
storing the combined animation in a predetermined file format in the terminal device.

2. The method according to claim 1, wherein the order of the file sequences is the average of shooting time points of the file sequences.

3. The method according to claim 1, wherein after sorting the media files within each of the file sequences according to the creation time point of the media files, the method further comprises:
generating a sequence tag image for one of the file sequences according to the similarity; and
inserting the sequence tag image into the one of the file sequences as a start image of the one of the file sequences.

4. The method according to claim 3, wherein the sequence tag image for the one of the file sequences comprises a characteristic landscape of the shooting location.

5. The method according to claim 1, wherein the predetermined file format for storing the combined animation comprises one of video or animated image format.

6. The method according to claim 1, further comprising:
monitoring and obtaining local media file access triggered and performed by a user in a social media application for obtaining the multiple selected media files; and
sharing the combined animation with other users of the social media application.

7. A media file processing device, comprising:
a memory storing computer readable instructions;
a processor in communication with the memory, wherein the processor, when executing the instructions, is configured to cause the media file processing device to:
obtain multiple selected media files;
extract content association information corresponding to the multiple selected media files, wherein the content association information comprises:
shooting location;
creation time point; and
facial property;
aggregate the multiple selected media files according to a similarity of the shooting location or the facial property between the multiple selected media files to form file sequences;
sort the media files within each of the file sequences according to the creation time point of the media files;
count a total number of the file sequences;
calculate, according to a preset animation playback duration and the total number of the file sequences, a duration occupied by each of the file sequences;
calculate display time points of the media files in each of the file sequences according to the creation time point of the media files in each of the file sequences and the duration occupied by each of the file sequences;
adjust the display time points of the media files in each of the file sequences based on a weighting factor;
form an animation timeline for each of the file sequences, using the calculated display time points of the media files in each of the file sequences;
synthesize, for each of the file sequences, the multiple selected media files according to the animation timeline to obtain an animation, the animation being a dynamic presentation of contents of the media files in each of the file sequences;
combine the animation of each of the file sequences to form a combined animation, based on an order of the file sequences; and
the combined animation in a predetermined file format in the media file processing device.

8. The media file processing device of claim 7, wherein the order of the file sequences is the average of shooting time points of the file sequences.

9. The media file processing device according to claim 7, wherein the processor, after executing the instructions to sort the media files within each of the file sequences according to the creation time point of the media files, is further configured to cause the media file processing device to:
generate a sequence tag image for one of the file sequences according to the similarity; and
insert the sequence tag image into the one of the file sequences as a start image of the one of the file sequences.

10. The media file processing device according to claim 9, wherein the sequence tag image for the one of the file sequences comprises a characteristic landscape of the shooting location.

11. The media file processing device according to claim 7, wherein the predetermined file format for storing the combined animation comprises one of video or animated image format.

12. The media file processing device according claim 7, wherein the processor, when executing the instructions, is further configured to cause the media file processing device to:

monitor and obtain local media file access triggered and performed by a user in a social media application for obtaining the multiple selected media files; and share the combined animation with other users of the social media application.

* * * * *